May 22, 1956    H. B. McCORD ET AL    2,746,417
INDICATING DIAL
Filed March 9, 1953

INVENTORS.
HOWARD B. McCORD
HERBERT E. McALISTER
BY THEIR ATTORNEYS.
HARRIS, KIECH, FOSTER & HARRIS
BY
Lorenzo F. Kiech _United States Patent Office_

2,746,417
Patented May 22, 1956

2,746,417
INDICATING DIAL

Howard B. McCord, La Canada, and Herbert E. McAlister, Pasadena, Calif., assignors, by mesne assignments, to Beckman Instruments, Inc., Fullerton, Calif., a corporation of California Application March 9, 1953, Serial No. 341,094

15 Claims. (Cl. 116—124)

The present invention relates in general to position indicating devices, and more particularly, to devices for performing position controlling and/or indicating functions. More specifically, the invention is capable of controlling and/or indicating the angular position of a rotor, such as a shaft, the invention being adapted to indicate the number of revolutions and/or fraction of a revolution through which the rotor has been rotated. Also, the invention may be utilized to control and/or indicate the angular position of an element carried by the rotor, or to control and/or indicate the position of an element which is driven by the rotor, or to indicate the position of an element which drives the rotor.

The invention is of particular utility when utilized in connection with such devices as variable resistors, inductors and capacitors, for example, and we prefer to consider herein an application of the invention to a variable resistor as a matter of convenience. However, as will be readily apparent to those skilled in the art, the invention is susceptible of various other applications and it will therefore be understood that it is not to be regarded as limited to the specific application elected for consideration herein for purposes of illustration.

An important object of the invention is to provide a device which is not only adapted to be used in connection with a rotor, such as the shaft of a variable resistor, for example, to indicate the angular position thereof, but which is also adapted to be used to rotate the shaft to control the angular position thereof. A related object is to provide such a device having both a manually operable control knob for varying the angular position of the shaft, or other rotor with which it is associated, and an indicating means for indicating accurately the angular position of the shaft, i. e., the number of revolutions and/or fraction of a revolution through which the shaft has been turned.

Another object of the invention is to provide such a device having two indicators, hereinafter termed the "revolution" and "fraction" indicators, which are adapted to show the number of complete revolutions and any fraction of a revolution, respectively, through which the shaft, or other rotor, has been turned.

An important object of the invention is to provide such an indicating device wherein the fraction indicator is adapted to be rigidly connected to the rotor with which the device is to be used. Thus, the indicator which is used in making accurate readings or adjustments, i. e., the fraction indicator, is not subject to any lost motion, due to gear backlash, or the like, which is an important feature of the invention.

An important object is to provide intermittently operating gear means which connects the revolution indicator to the fraction indicator once during each revolution of the latter so as to rotate the revolution indicator step by step, the revolution indicator being rotated one step for each full revolution of the fraction indicator. Thus, the revolution indicator is rotated one step during only a small part of each revolution of the fraction indicator so that it remains stationary during almost all of each revolution of the fraction indicator. This makes for easier reading of the revolution indicator and results in a lower driving torque for the fraction indicator during most of each revolution thereof, which are important features.

Another object is to provide a control and/or indicating device wherein the fraction indicator is provided with a gear segment thereon and wherein the revolution indicator is provided with a complete gear thereon, an idling gear being meshed with the gear on the revolution indicator and being adapted to mesh with the gear segment on the fraction indicator once per revolution of the latter to rotate the revolution indicator one step for each complete revolution of the fraction indicator. In effect, the idling gear thus causes the revolution indicator to "jump" one step for each revolution of the fraction indicator and, accordingly, it will be referred to as a "jump gear" hereinafter for convenience.

Another object is to provide a device having a base on which the revolution indicator and the jump gear are rotatably mounted and through which a shaft with which the device is to be used extends, the fraction indicator being rigidly mounted on the shaft. A releated object is to provide a device wherein the fraction and revolution indicators are coaxial and wherein the jump gear is disposed within the confines thereof to provide a very compact device, which is an important feature.

Another object is to provide a base having thereon a cylindrical projection and to provide the gear on the revolution indicator with inwardly facing gear teeth the inner ends of which form a discontinuous bearing surface journalled on the cylindrical projection on the base to provide a simple means of rotatably mounting the revolution indicator on the base.

Another object of importance is to provide locking means for locking the fraction indicator in any desired position so that a desired setting of the device will not be altered by vibration, or the like.

Another object is to provide a locking means comprising a brake shoe engageable with the fraction indicator and comprising cam means for biasing the brake shoe into engagement with the fraction indicator, the cam means being manually operable.

Another object is to provide a device wherein the aforesaid cylindrical projection on the base is in the form of an annular rail and wherein the fraction indicator is provided with a hub disposed within the annular rail and engageable therein by the brake shoe. A related object is to provide two gaps in the annular rail, one gap being occupied by the jump gear and the other being occupied by a pivoted end of the brake shoe.

Still another object is to provide stop means on the jump gear engageable with stop means on the fraction indicator to prevent rotation of the jump gear, and therefore the revolution indicator, except when the gear segment on the fraction indicator is meshed with the jump gear. More particularly, an object is to provide elongated teeth on the jump gear which are engageable with an annular shoulder on the fraction indicator except when the gear segment on the fraction indicator is in mesh with the jump gear, the annular shoulder being interrupted by the gear segment on the fraction indicator so that the elongated teeth on the jump gear disengage such annular shoulder when the jump gear is in mesh with the gear segment on the fraction indicator to permit rotation of the jump gear and the revolution indicator under such conditions.

Another object is to provide a device wherein the jump gear and the brake shoe are mounted on pins extending through the base and having heads under which the cam means for the brake shoe is disposed to secure the cam means in place, these pins thus serving dual functions, which is an important feature.

Another object is to provide a locating plate with tabs thereon one of which is adapted to engage a recess in the base and the other of which is adapted to engage a recess in a panel on which the device is to be mounted, thereby positively positioning the device.

The foregoing objects, advantages and features of the present invention, together with various other objects, advantages and features thereof which will become apparent, may be attained with the exemplary embodiment of the invention illustrated in the accompanying drawing and described in detail hereinafter. Referring to the drawing.

Figure 1:
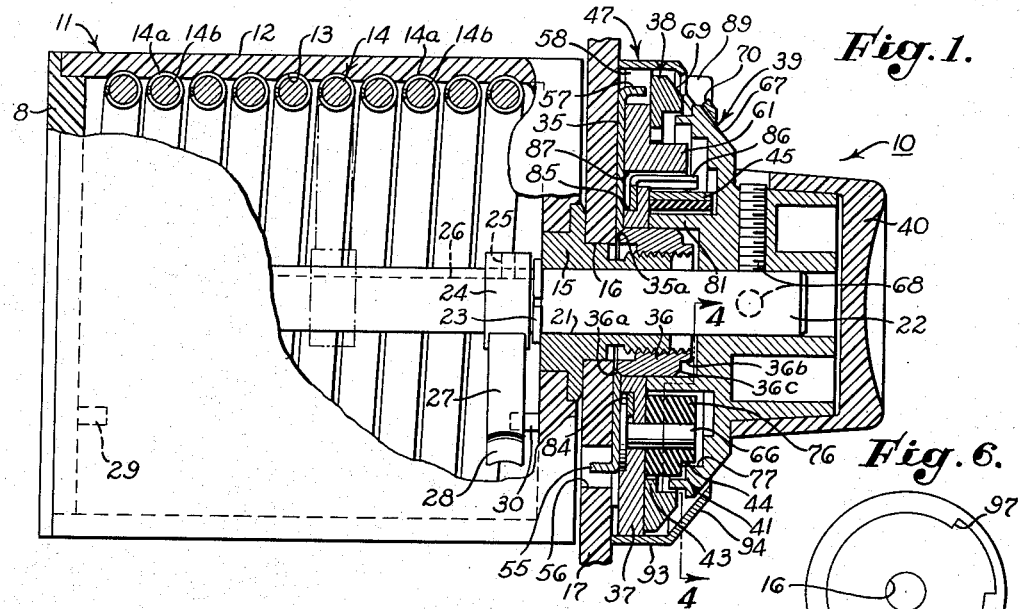
Fig. 1 is a longitudinal sectional view of an angular-position indicating and controlling device which represents the presently preferred embodiment of the invention, as used in connection with a variable resistor.

Referring particularly to Fig. 1 of the drawing, the embodiment of the indicating and controlling device of the invention which is illustrated therein is designated generally by the numeral 10 and is shown in use in connection with a variable resistor 11 which, per se, forms no part of the present invention. The resistor 11 is diagrammatically shown as including a cylindrical housing 12 which is provided with a shallow, helical groove 13 therein to receive the major turns of a helical, wound resistance element 14, the resistance element being shown as having ten complete major turns, although any desired number of such turns may be employed. Each major turn comprises a large number of minor turns 14a wound helically around a core 14b. Molded or otherwise secured to one end of the housing 12 is an externally threaded fitting 15 which is adapted to project through an opening 16 in a panel 17, the opposite end of the housing being closed by a cover 18. Journalled in a bore 21 in the fitting 15 is a shaft 22 having an annular groove therein for a split ring 23, or the like, the latter being adapted to seat against the inner end of the fitting 15 to prevent outward axial movement of the shaft.

The shaft 22 carries a collar 24 which is slidable longitudinally of the shaft, but which is prevented from rotating relative to the shaft by a pin 25 extending into a longitudinal groove 26 in the shaft. The collar 24 is provided with an arm 27 having thereon a grooved contact 28 which partially encircles the resistance element 14, this contact being adapted to slide along the helical resistance element as the shaft 22 is rotated so as to move the collar 24 longitudinally of the shaft. It will be apparent that as the shaft 22 is rotated in the clockwise direction, as viewed from the right in Fig. 1 of the drawings, the contact 28 will follow the turns of the resistance element 14 to move the collar 24 axially from right to left. Conversely, by rotating the shaft 22 in the counterclockwise direction, the collar 24 may be moved from left to right. Such axial movement of the collar 24 is limited by stops 29 and 30 which are mounted on the inner surfaces of the end walls of the cylindrical housing 12 in the path of the arm 27 in positions such that they limit movement of the sliding contact 28 beyond the corresponding ends of the helical resistance element 14.

The variable resistor 11 may be incorporated in an electrical circuit whose resistance is to be varied by means of suitable connections (not shown) to the sliding contact 28 and one end of the helical resistance element 14. Alternatively, the resistor 11 may be connected as a potentiometer. Thus, the resistance provided by the variable resistor 11 depends upon the position of the sliding contact 28, the resistance from one end being a minimum when the sliding contact is in one extreme position and being a maximum when it is in the other extreme position. It will be apparent that in order to determine the resistance offered by the variable resistor 11, it is necessary to determine the position of the sliding contact 28 on the resistance element 14. This may be accomplished by determining the number of revolutions and/or fraction of a revolution through which the shaft 22 has been rotated, which is the function of the indicating device 10 in the particular application illustrated.

Referring particularly to Fig. 1 of the drawings, the device 10 includes several main components which will be considered in a general way before turning to a detailed consideration thereof. First, the device includes a locating element or member 35 adapted to seat against the outer surface of the panel 17 and adapted to be secured in such position by a nut 36 threaded on the fitting 15, the nut 36 also holding the resistor 11 in place. Seated on the outer surface of the locating element 35 is a base 37 of the device 10. Rotatably mounted on the base 37 is a revolution indicator 38, the revolution indicator also being referred to as a second indicator hereinafter. Fixed on the outer end of the shaft 22 and adapted to hold the revolution indicator 38 on the base 37 is a fraction indicator 39 which includes a control knob 40 for rotating the shaft, the fraction indicator 39 also being referred to as a first indicator hereinafter. The device 10 also includes an intermittently operating gear means, designated generally by the numeral 41, which connects the revolution indicator 38 to the fraction indicator 39 once during each revolution of the fraction indicator so as to rotate the revolution indicator incrementally at the frequency of rotation of the fraction indicator. In other words, the gear means 41 rotates the revolution indicator 38 one step for each complete revolution of the fraction indicator 39. Considered generally, the gear means 41 includes an inwardly facing gear segment 42, Fig. 4, on the fraction indicator 39, an inwardly facing gear 43 on the revolution indicator 38 which is in axial alignment or registry with the gear segment 42, and an intermittently operating or jump gear 44 carried by the base 37. The jump gear 44 is continuously meshed with the gear 43 and meshes with the gear 42 once during each revolution of the fraction indicator 39 so as to rotate the revolution indicator 38 one step at the end of each complete revolution of the fraction indicator. The device 10 also includes means, illustrated as comprising a brake shoe 45 mounted on the base 37 and urgeable into frictional engagement with the fraction indicator 39 by a cam means 46 on the base, for locking the fraction indicator 39 in any desired position so that the setting thereof will not be disturbed by vibration, or the like, thereby maintaining the contact 28 in the desired position. An annular housing or cover 47 secured to the base 37 partially encloses the indicators 38 and 39 and maintains the various components in assembled relation, particularly before the knob 40 is secured to the shaft 22.

Considering the aforementioned main components of the device 10 in more detail, the locating element 35 may be a disc or plate which is clamped against the outer surface of the panel 17 by the nut 36, the locating element and the nut respectively having interengaging bevelled surfaces 35a and 36a, as clearly shown in Fig. 1 of the drawing. The locating element 35 has a tab 55 thereon which projects inwardly into a hole 56 in the panel 17 and has a tab 57 which projects outwardly into a recess or notch 58 in the periphery of the base 37. Consequently, the locating element 35 automatically positions the device 10 properly relative to the resistor 11. The nut 36 also has a portion 36b of reduced diameter adapted to fit into the bore 16, when the nut is turned end for end, to accommodate a thicker panel. In this case, a bevelled surface 36c on the nut engages the surface 35a.

Figures 2, 3, 6:
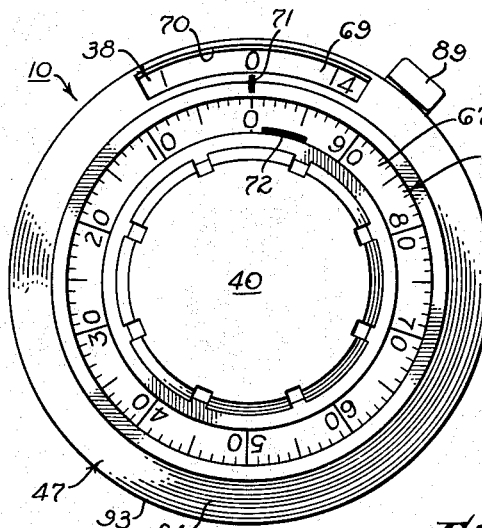
Fig. 2 is an end elevation of the device illustrated in Fig. 1, as viewed from the right.
Fig. 3 is a view which is similar to Fig. 2 except that a fraction indicator and control knob of the device have been removed.
Fig. 6 shows a template used to mount the invention.

The base 37 is seated against the outer surface of the locating element 35 and is annular so that it encircles the nut 36, the nut having concentric segments 36d which the base engages to properly locate it relative to the shaft 22. The base 37 is provided with an axially extending, annular cylindrical projection or rail 61 thereon which, as best shown in Fig. 3, is provided with gaps 62 and 63 therein for a purpose to be described. The inner ends of the teeth of the gear 43 on the revolution indicator 38 form a discontinuous, cylindrical bearing surface the diameter of which is slightly greater than the outside diameter of the annular rail 61 so that the revolution indicator 38 is journalled on the annular rail 61 by means of the teeth on the gear 43 thereof. Thus, the revolution indicator 38 is rotatably mounted on the base 37 by the teeth of the gear 43 thereof so that no other journalling means is required, which is an important feature since it simplifies the device 10 and renders it more compact.

Figures 4, 5:
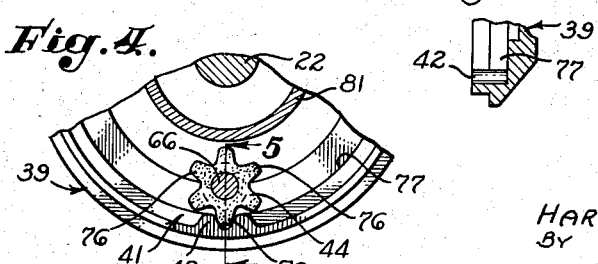
Fig. 4 is a fragmentary sectional view taken along the irregular arrowed line 4—4 of Fig. 1.
Fig. 5 is a fragmentary sectional view taken as indicated by the arrowed line 5—5 of Fig. 4, with a jump gear of the device removed.

As hereinbefore indicated, the inwardly facing teeth of the gear 43 on the revolution indicator 38 and of the gear segment 42 of the fraction indicator 39 are in axial alignment or registry, the jump gear 44 being located radially inwardly of the gear segment 42 and the gear 43 and being adapted to mesh therewith. The jump gear 44 is rotatably mounted in the gap 62 on a headed pin 66 which extends through the base 37, as best shown in Fig. 1 of the drawing, and is in continuous mesh with the gear 43 on the revolution indicator 38. As best shown in Fig. 4 of the drawing, as the fraction indicator 39 approaches the end of each revolution thereof, the teeth of its gear segment 42 rotate the jump gear 44, thereby rotating the revolution indicator 38 one increment or step. Because of the particular positional relationship between the gear segment 42, the gear 43 and the jump gear 44, the direction of rotation of the revolution indicator 38 is the same as that of the fraction indicator 39, which is an important feature since it makes for easier reading of the indicators 38 and 39, these indicators being provided with indicia thereon as described in the next paragraph.

As best shown in Fig. 2 of the drawing, the fraction indicator 39 is provided with an annular dial 67 which encircles the control knob 40, the latter being secured to the shaft 22 by set screws 68 and being adapted to hold the revolution indicator 38, the jump gear 44 and the brake shoe 45 on the base 37 to supplement the action of the annular housing 47 in holding these elements on the base. The dial 67 is provided with the indicia "0," "10," "20," etc., thereon, these indicia being, in effect, decimal indicia which indicate the percentage of a revolution through which the fraction indicator has been rotated. Similarly, the revolution indicator 38 is provided with an annular dial 69 which, in the particular construction illustrated, encircles the dial 67. The dial 69 is provided with the indicia "0," "1," "2," etc. thereon. In the particular construction illustrated, only three of the indicia on the dial 69 are visible at any one time through an arcuate window 70 in the annular housing 47, the latter being provided with an indicium 71 which serves as a reference for reading the dials 67 and 69.

Considering the operation of the device 10 as thus far described, it will be assumed that the "0" indicia of the dials 67 and 69 are in registry with the reference indicium 71, as shown in Fig. 2 of the drawing, which means that the contact 28 is at one end of the helical resistance element 14, i. e., at the right end of such element, as viewed in Fig. 1 of the drawing. If the control knob 40 is now rotated in the clockwise direction, as viewed in Fig. 2 of the drawing, the contact 28 will be advanced toward the left, as viewed in Fig. 1 of the drawing. Near the end of one complete revolution of the control knob 40, which corresponds to one complete revolution of the sliding contact 28, the gear segment 42 on the fraction indicator 39 meshes with the jump gear 44 and rotates the revolution indicator 38 one increment or step, thereby bringing the indicium "1" into registry with the reference indicium 71 to indicate that the sliding contact 28 has been advanced one complete revolution, i. e., has advanced one complete turn of the resistance element 14. As a precautionary measure, a short arcuate indicium 72, which is preferably red, is located on the dial 67 adjoining the "0" indicium thereon and between the "0" indicium and the "90" indicium thereon. When the indicium 72 is near the reference indicium 71, this indicates that caution should be exercised in reading the revolution indicator 38 since the gear segment 42 is in mesh with the jump gear 44 and is in the process of rotating the revolution indicator 38 one increment.

Thus, the revolution indicator 38 indicates the number of complete turns of the helical resistance element 14 which the sliding contact 28 has been advanced from its zero or starting position, and the fraction indicator 39 indicates, in decimals, the fraction of a complete turn through which the contact 28 has been advanced. For example, if the indicium "5" of the revolution indicator 38 is in registry with the reference indicium 71 and the indicium "40" of the fraction indicator 39 is in registry with the reference indicium 71, the operator is advised that the sliding contact 28 has been advanced 5.40 turns of the helical resistance element 14 from its starting or zero position. Also, if the element 14 has ten turns, this reading may be taken to indicate that the contact 28 has traversed 54.0% of the length of the element 14, or the reading may be noted as a decimal, viz., 0.540. It will be understood that while the dials 67 and 69 have been described as calibrated in terms of revolutions and decimals of revolutions, they may be calibrated in other terms, such as resistance, for example.

It will be noted that since the knob 40 is rigidly connected to the shaft 22, there is a direct connection between the decimal dial 67 and the sliding contact 28 so that the angular position of the sliding contact throughout a particular turn of the resistance element 14 is always accurately indicated and is not subject to any errors due to gearing backlash, or the like, which is an important feature of the invention. Any backlash in the intermittently operating gear means 41 does not affect the accuracy of indication of the device 10 because of the incremental or step-by-step rotation of the revolution indicator 38. In other words, slight errors in the angular position of the revolution indicator 38 relative to the reference indicium 71 are unimportant since such errors are very small as compared to the angle through which the revolution indicator is rotated in its step-by-step or incremental movement.

In order to prevent accidental rotation of the revolution indicator 38 by the finger tips of an operator manipulating the knob 40, or otherwise, the jump gear 44 and the fraction indicator 39 are provided with stop means for locking the revolution indicator 38 in the particular position into which it has been rotated until such time as it is again rotated by the gear means 41. The stop means on the jump gear 44 takes the form of elongated teeth thereon, alternate teeth 76 on the jump gear being longer than the teeth therebetween, as best shown in Fig. 1 of the drawing. The stop means on the fraction indicator 39 comprises an annular shoulder 77 which faces radially inwardly and which is interrupted by the gear segment 42. When the gear segment 42 is out of mesh with the jump gear 44, two of the elongated teeth 76 on the jump gear engage the annular shoulder 77 at circumferentially spaced points to prevent rotation of the jump gear, the shorter intermediate tooth on the jump gear being between two teeth on the gear 43. Consequently, such locking of the jump gear prevents accidental rotation of the revolution indicator 38. The shorter intervening teeth on the jump gear 44 are short enough that they do not engage the annular shoulder 77, as shown in Fig. 1 of the drawing, so as to permit rotation of the fraction indicator 39. Since the gear segment 42 on the fraction indicator 39 interrupts the annular shoulder 77 thereon, the long teeth 76 on the jump gear 44 disengage the annular shoulder 77 when the gear segment meshes with the jump gear, thereby permitting rotation of the revolution indicator 38 under such conditions, but under such conditions only. Thus, the revolution indicator 38 is locked against rotation except when the gear segment 42 is in mesh with the jump gear 44 to rotate the revolution indicator one increment, which is an important feature of the invention.

Considering the locking means for securing the sliding contact 28 in a position in which it has been set in the manner hereinbefore described, the brake shoe 45 is disposed between the annular rail 61 and a hub 81 on the fraction indicator 39 and is frictionally engageable with such hub to lock the fraction indicator 39, and therefore the sliding contact 28, in any desired position, the hub 81 engaging the segments 36d of the nut 36 to align these parts relative to each other. The shoe 45 has an end 82 which extends into the gap 63 in the annular rail 61 and which is pivotally connected therein to the base 37 by a headed pin 83 extending through the base.

The cam means 46 for biasing the brake shoe 45 into frictional engagement with the hub 81 includes a flat ring 84 which is rotatable in an annular recess 85 in the rear surface of the base 37 and which fits under the heads of the previously mentioned headed pins 66 and 83. Consequently, the pins 66 and 83, in addition to serving as pivots for the jump gear 44 and the brake shoe 45, respectively, serve to retain the flat ring 84 in its recess 85, which is a feature of the invention. The ring 84 carries a cam tab 86 which projects forwardly through an arcuate slot 87 in the base 37 into a position between the brake shoe 45 and the annular rail 61. The outer surface of the brake shoe 45 is of progressively increasing radius in a direction away from the pivoted end 82 thereof so that, as the ring 84 is rotated in the clockwise direction, as viewed in Fig. 3 of the drawing, the tab 86 on the ring 84 cams the brake shoe inwardly into frictional engagement with the hub 81 of the fraction indicator 39 to frictionally lock same in a desired position. The ring 84 is rotated by means of an integral lever 88 which extends radially outwardly and which is equipped at its outer end with a finger piece 89. The rear surface of the base 37 and the periphery of the housing 47 are provided with pie-shaped recesses therein, not shown, in which the lever 88 swings as it is rotated between the position shown in Fig. 3 of the drawing, wherein it releases the brake shoe 45, and a position wherein the tab 86 cams the brake shoe into frictional engagement with the hub 81.

The annular housing 47 is, as best shown in Fig. 1 of the drawing, provided with a peripheral skirt 93 which is pressed onto the base 37 and engages the periphery thereof, the periphery of the base 37 preferably being grooved or knurled to frictionally retain the skirt 93 of the housing 47. Also provided on the housing 47 is an inwardly inclined flange 94 in which the arcuate window 70 is formed and which extends inwardly over the periphery of the fraction indicator 39 to hold the fraction indicator in place relative to the base 37, and thereby to hold the revolution indicator 38, the jump gear 44 and the brake shoe 45 in place. The flange 94 of the annular housing 47 performs this function prior to installation of the device 10 on the panel 17 and prior to securing the knob 40 of the fraction indicator 39 to the shaft 22. After the knob 40 is so secured, it also maintains the various parts between it and the base in assembled relationship. It will be noted that, as previously mentioned, the split ring 23 prevents axial movement of the shaft 22 toward the right, as viewed in Fig. 1. Since the knob 40 is fixed to the shaft 22, the device 10 prevents axial movement of the shaft 22 toward the left, as viewed in Fig. 1 of the drawing.

One feature not heretofore discussed resides in the use of a template 96 for locating the holes 16 and 56 in the panel 17 and for properly positioning the base 37 and other components. The template 96 is provided with a pressure-sensitive adhesive thereon so that it can readily be adhered to the panel and the holes 16 and 56 are marked thereon so that they may be drilled in the proper locations readily. An arcuate wedge segment 97 is also marked on the template 96 so that the base 37 and the housing 47 can be positioned properly by registering the aforementioned pie-shaped recesses therein with the indicium 97.

Although we have disclosed an exemplary embodiment of our invention herein for purposes of illustration, it will be understood that various changes, modifications and substitutions may be incorporated in such embodiment without necessarily departing from the spirit of the invention as defined by the claims which follow.

We claim as our invention:

1. In a device for controlling and indicating the angular position of a rotor, the combination of: a first rotatable indicator having a gear segment thereon; a control knob; means for connecting said control knob and said first indicator to the rotor; a base; a second rotatable indicator coaxial with said first indicator and having a gear thereon, said second indicator being rotatably mounted on said base; a jump gear rotatably mounted on said base, said jump gear being meshed with said gear on said second indicator and meshing with said gear segment on said first indicator once per revolution of said first indicator so as to rotate said second indicator incrementally at the frequency of rotation of said first indicator; and means for preventing rotation of said second indicator when said jump gear is out of mesh with said gear segment on said first indicator.

2. In a device mountable on a panel to indicate the angular position of a rotor having a shaft projecting through the panel, the combination of: an annular base; means for mounting said base on the panel with the shaft projecting therethrough; a first rotatable indicator having a gear segment thereon; means for connecting said first indicator to the shaft outwardly of said base; a second rotatable indicator coaxial with said first indicator and having a gear thereon, said second indicator being rotatably mounted on said base; a jump gear rotatably mounted on said base, said jump gear being meshed with said gear on said second indicator and meshing with said gear segment on said first indicator once per revolution of said first indicator so as to rotate said second indicator incrementally at the frequency of rotation of said first indicator; and stop means on said jump gear engageable with stop means on said first indicator when said jump gear is out of mesh with said gear segment on said first indicator for preventing rotation of said jump gear and said second indicator when said gear segment on said first indicator is out of mesh with said jump gear.

3. A device as defined in claim 2 wherein said stop means on said jump gear comprises elongated gear teeth thereon and wherein said stop means on said first indicator comprises an annular shoulder thereon which is engageable by said elongated gear teeth and which is interrupted by said gear segment on said first indicator.

4. In a device for indicating the angular position of a rotor, the combination of: a first rotatable indicator operatively connected to the rotor and having a gear segment thereon; a base; a second rotatable indicator coaxial with said first indicator and having a gear thereon, said second indicator being rotatably mounted on said base; a jump gear rotatably mounted on said base, said jump gear being meshed with said gear on said second indicator and meshing with said gear segment on said first indicator once per revolution of said first indicator so as to rotate said second indicator incrementally at the frequency of rotation of said first indicator; and locking means mounted on said base and engageable with said first indicator for locking said first indicator and the rotor in any desired angular position.

5. A device as defined in claim 4 wherein said locking means comprises a brake shoe pivoted on said base and engageable with said first indicator and comprises cam means mounted on said base for camming said brake shoe into engagement with said first indicator.

6. A device as defined in claim 5 wherein said jump gear is rotatably mounted on said base by means of a pin and wherein said brake shoe is pivotally mounted on said base by means of another pin, said pins having heads thereon and said cam means including a member rotatably mounted on said base and held in assembled relation therewith by being inserted under the heads of said pins.

7. In a device for controlling and indicating the angular position of a rotor, the combination of: a first rotatable indicator having a gear segment thereon; a control knob; means for connecting said control knob and said first indicator to the rotor; a base; a second rotatable indicator coaxial with said first indicator and having a gear thereon, said second indicator being rotatably mounted on said base; and a jump gear rotatably mounted on said base, said jump gear being meshed with said gear on said second indicator and meshing with said gear segment on said first indicator once per revolution of said first indicator so as to rotate said second indicator incrementally at the frequency of rotation of said first indicator, said gear segment on said first indicator and said gear on said second indicator having inwardly extending gear teeth, said jump gear being located inwardly of said gear segment on said first indicator and said gear on said second indicator, the inner ends of said gear teeth on said gear of said second indicator forming a discontinuous bearing surface which is journalled on a cylindrical projection on said base.

8. In a device for indicating the angular position of a rotor, the combination of: a base having an annular rail thereon; a first rotatable indicator operatively connectible to the rotor and coaxial with said annular rail, said first indicator having a hub extending into said annular rail and having a gear segment thereon exteriorly of said annular rail, said gear segment having inwardly facing gear teeth; a second rotatable indicator coaxial with said annular rail and having a gear thereon, said gear on said second indicator being located exteriorly of said annular rail and having inwardly facing gear teeth thereon the inner ends of which engage said annular rail to journal said second indicator thereon; and a jump gear rotatably mounted on said base and disposed in a gap in said annular rail, said jump gear being meshed with said gear on said second indicator and meshing with said gear segment on said first indicator once per revolution of said first indicator so as to rotate said second indicator step by step at the frequency of rotation of said first indicator.

9. A device as defined in claim 8 including a brake shoe disposed between said annular rail and said hub of said first indicator and engageable with said hub of said first indicator to lock same in any desired position, said brake shoe having an end disposed in another gap in said annular rail and pivotally connected to said base, said device including cam means for biasing said brake shoe into engagement with said hub of said first indicator.

10. A device as defined in claim 9 wherein said first indicator is provided with an annular shoulder thereon engageable by gear teeth on said jump gear when said gear segment is out of mesh with said jump gear for preventing rotation of said second indicator, said annular shoulder being interrupted by said gear segment so that said gear teeth on said jump gear disengage said annular shoulder when said jump gear is meshed with said gear segment, whereby to permit rotation of said second indicator when said jump gear is meshed with said gear segment.

11. In a device for indicating the angular position of a rotor, the combination of: a first rotatable indicator operatively connected to the rotor and having a gear segment thereon; a base; a second rotatable indicator coaxial with said first indicator and having a gear thereon, said second indicator being rotatably mounted on said base; a jump gear rotatably mounted on said base, said jump gear being meshed with said gear on said second indicator and meshing with said gear segment on said first indicator once per revolution of said first indicator so as to rotate said second indicator incrementally at the frequency of rotation of said first indicator; and a locating element engageable with said base and having a first tab thereon insertable into a recess in said base and having a second tab thereon insertable into a recess on a panel, or the like, on which said device is to be mounted.

12. In a device of the character described, the combination of: a base having a cylindrical projection thereon; an outer dial encircling said cylindrical projection and having thereon a gear provided with inwardly facing gear teeth the inner ends of which engage said cylindrical projection so that said outer dial is journalled on said cylindrical projection thereby; an inner dial concentric with said outer dial and spaced radially inwardly therefrom and provided with a gear segment thereon having inwardly facing gear teeth axially aligned with said gear teeth of said gear on said outer dial; and a jump gear rotatably mounted on said base and meshed with said gear on said outer dial, said jump gear being adapted to mesh with said gear segment on said inner dial once per revolution of said inner dial, whereby said outer dial is rotated step by step as said inner dial is rotated.

13. In combination: a panel having a bore therethrough; a device seated against the rear face of said panel and having a cylindrical projection extending forwardly through said bore, said device including a shaft extending forwardly from said cylindrical projection; a nut threaded on said cylindrical projection to seat said device against said rear panel face; a base encircling said nut forwardly of said panel; a first indicator fixed on said shaft forwardly of said base; a second indicator rotatably mounted on said base on the forward side thereof; and intermittently operating gear means operatively connecting said second indicator to said first indicator once per revolution of the latter for rotating said second indicator incrementally at the frequency of rotation of said first indicator.

14. The combination of claim 13 wherein said nut has at its forward end a cylindrical portion adapted to fit in said bore, whereby said nut may be turned end for end to accommodate a thicker panel.

15. The combination of claim 13 including a template adhered to the forward face of said panel and having thereon indicia for locating said bore and said base.

References Cited in the file of this patent

UNITED STATES PATENTS

| | | |
|---|---|---|
| 1,692,605 | Wolf | Nov. 20, 1928 |
| 2,440,522 | Ost | Apr. 27, 1948 |
| 2,539,575 | George | Jan. 30, 1951 |